United States Patent
Wind et al.

(10) Patent No.: US 7,037,584 B2
(45) Date of Patent: May 2, 2006

(54) COATINGS HAVING LOW VOLATILE ORGANIC COMPOUND CONTENT

(75) Inventors: Donald G. Wind, Gibsonia, PA (US); Robert M. O'Brien, Monongahela, PA (US); Richard H. Evans, Wexford, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 10/506,984

(22) PCT Filed: Mar. 7, 2003

(86) PCT No.: PCT/US03/06889

§ 371 (c)(1),
(2), (4) Date: Dec. 15, 2004

(87) PCT Pub. No.: WO03/076530

PCT Pub. Date: Sep. 18, 2003

(65) Prior Publication Data

US 2005/0107495 A1 May 19, 2005

Related U.S. Application Data

(60) Provisional application No. 60/362,771, filed on Mar. 8, 2002.

(51) Int. Cl.
*B32B 27/38* (2006.01)
*C08L 63/00* (2006.01)

(52) U.S. Cl. ................. 428/413; 525/529; 525/530

(58) Field of Classification Search ............... 426/413, 426/414, 415, 416, 417, 418, 500, 523; 523/400, 523/402, 406, 412, 413, 426; 525/107, 119, 525/523, 529, 530, 531
See application file for complete search history.

(56) References Cited

U.S. PATENT DOCUMENTS

| | | | |
|---|---|---|---|
| 4,085,161 A | 4/1978 | Sekmakas et al. | |
| 4,446,258 A | 5/1984 | Chu et al. | |
| 4,468,307 A | 8/1984 | Wismer et al. | |
| 4,476,262 A | 10/1984 | Chu et al. | |
| 4,605,690 A | 8/1986 | Debroy et al. | |
| 4,608,314 A | 8/1986 | Turpin et al. | |
| 4,639,299 A | 1/1987 | Turpin et al. | |
| 4,742,097 A | 5/1988 | Turpin et al. | |
| 4,981,887 A | 1/1991 | Ruhoff et al. | |
| 5,082,922 A | 1/1992 | Brandenburger et al. | |
| 5,252,637 A | 10/1993 | Craun et al. | |
| 5,264,469 A | 11/1993 | Mysliwczyk et al. | |
| 5,296,525 A | 3/1994 | Spencer | |
| 5,567,781 A | 10/1996 | Martino et al. | |
| 5,635,049 A | 6/1997 | Mysliwczyk et al. | |
| 5,686,511 A | 11/1997 | Bobo | |
| 5,840,384 A * | 11/1998 | Noda et al. ................. | 428/35.8 |
| 5,908,902 A | 6/1999 | Pfeil et al. | |
| 5,922,817 A | 7/1999 | Pedersen et al. | |
| 5,925,694 A | 7/1999 | Stengel-Ruthkowski et al. | |
| 5,932,636 A | 8/1999 | Neumann et al. | |
| 5,972,432 A | 10/1999 | Chutko et al. | |
| 5,976,700 A | 11/1999 | Chutko et al. | |
| 6,087,417 A | 7/2000 | Stevenson et al. | |
| 6,201,043 B1 | 3/2001 | Bremser et al. | |
| 6,235,102 B1 | 5/2001 | Parekh et al. | |
| 6,270,855 B1 | 8/2001 | Jung et al. | |
| 6,300,428 B1 | 10/2001 | Stevenson et al. | |
| 6,306,934 B1 | 10/2001 | Bode et al. | |
| 2002/0016226 A1* | 2/2002 | Jin et al. ..................... | 473/378 |
| 2003/0176527 A1* | 9/2003 | Votteler et al. ............. | 522/113 |

FOREIGN PATENT DOCUMENTS

| | | |
|---|---|---|
| EP | 0 116 225 A1 | 8/1984 |
| WO | WO 00/47642 A1 | 8/2000 |
| WO | WO 03/076536 A1 | 9/2003 |

OTHER PUBLICATIONS

American Society of Testing Materials, "ASTM Designation: D 2369-86, Standard Test Method for Volatile Content of Coatings," *Annual Book of ASTM Standards*, 1987;06.01:415-417, Publication page, and Title page.

American Society of Testing Materials, "ASTM Designation: D 3359-02, Standard Test Method for Measuring Adhesion by Tape Test," *Annual Book of ASTM Standards*, 2004;06.01:397-403, Publication page, and Title page.

McCutcheon's, vol. 1: Emulsifers & Detergents, North American Edition (2001). Title Page, Copyright and Table of Contents Page.

* cited by examiner

*Primary Examiner*—Michael J. Feely
(74) *Attorney, Agent, or Firm*—Mueting, Raasch & Gebhardt, P.A.

(57) ABSTRACT

The present invention provides a method of making an aqueous coating composition comprising an aqueous dispersion of an epoxy acrylate resin and a polymerized reactive diluent. The aqueous coating composition preferably has a volatile organic compound content of no greater than 0.4 kilogram per liter of solids.

24 Claims, No Drawings

COATINGS HAVING LOW VOLATILE ORGANIC COMPOUND CONTENT

This application claims the benefit of U.S. Provisional Application No. 60/362,771, filed Mar. 8, 2002, which is incorporated herein by reference in its entirety.

BACKGROUND

Aqueous coatings may be used to coat the inside of containers to meet various end use application requirements. For example, coatings used in containers for beer and beverages or other sanitary cans should meet strict requirements such as adhesion, boiling water tests, retorting, blush resistance and the like. To meet these requirements, most container coatings utilize curing resins. These curing resins, such as melamine formaldehyde polymers and others, release volatile organic compounds (VOCs) into the atmosphere during baking cycles. These VOCs are in addition to the solvents normally measured for VOC determination that are often used in aqueous coatings to promote substrate wetting, flow properties, etc.

Several attempts have been made to formulate coatings that do not introduce high levels of VOCs into the environment during curing. Unfortunately, however, most of these attempts result in unsatisfactorily coated products. For example, the removal or reduction of VOCs by vacuum stripping the aqueous solution has resulted in blisters or non-uniformly coated substrates.

From the foregoing, it will be appreciated that what is needed in the art is a coating composition that has reduced VOC content, and the ability to produce coated containers satisfactory to meet end oftentimes stringent use requirements.

SUMMARY

In one embodiment, this invention relates to a process of preparing an aqueous composition that is useful to coat the inside of containers. The process includes blending an epoxy material, a reactive diluent, and an acrylic resin; and reacting the epoxy material with the acrylic resin. The epoxy acrylate formed from the reaction of the epoxy material and the acrylic resin, and the reactive diluent are preferably dispersed in water. The reactive diluent is then polymerized in the presence of the epoxy acrylate to form the coating composition used in methods of the present invention. Surprisingly, the presently disclosed aqueous coating compositions are environmentally friendly, and preferably have no greater than 0.4 kilogram volatile organic compound content per liter of solids.

Another benefit of the present invention is a coating composition that is substantially free of formaldehyde.

DETAILED DESCRIPTION OF ILLUSTRATIVE EMBODIMENTS

In one embodiment, the present invention provides a method for producing an aqueous coating composition having reduced VOC content. As used herein, "volatile organic compound" ("VOC") refers to any compound of carbon, excluding carbon monoxide, carbon dioxide, carbonic acid, metallic carbides or carbonates, and ammonium carbonate, which participates in atmospheric photochemical reactions. Typically, volatile organic compounds have a vapor pressure equal to or greater than 0.1 mm Hg. As used herein, "volatile organic compound content" ("VOC content") means the weight of VOC per volume of the coating solids, and is reported, for example, as kilograms (kg) of VOC per liter. Preferably, the coating is suitable to coat the inside of a container and has a volatile organic compound content of no greater than 0.4 kilogram per liter of solids. More preferably, the aqueous composition of the present invention has no greater than 0.3 kilogram volatile organic compound content per liter of solids, more preferably no greater than 0.2 kilogram volatile organic compound content per liter of solids, and most preferably no greater than 0.1 kilogram volatile organic compound content per liter of solids. The desired volatile organic compound content of the coating composition of the present invention may be adjusted by the careful choice of components used and/or the sequence of reaction used to produce the composition.

In one embodiment, the present invention provides a method for preparing an aqueous coating composition that comprises: providing an epoxy material, a reactive diluent, and an acrylic resin; and blending them together. The method includes reacting the epoxy material with the acrylic resin. The epoxy acrylate (e.g., formed from the reaction of the epoxy material and the acrylic resin), and the reactive diluent are preferably further dispersed in water. The reactive diluent is then preferably polymerized in the presence of the epoxy acrylate to form the coating composition of the present invention having the desired low volatile organic compound content.

As used in the present invention, an "epoxy material" includes resins or compounds containing epoxy groups. The epoxy material of the present invention may be prepared by a variety of processes, for example, by the condensation of a dihydroxy compound and epichlorohydrin. Typical dihydroxy compounds usable in the present invention include diphenols and dihydric alcohols. A presently preferred dihydroxy compound is Bisphenol A.

The epoxy material suitable for use in the present invention may be prepared according to known procedures including those described in U.S. Pat. No. 4,446,258 (Chu et al.) and U.S. Pat. No. 4,476,262 (Chu et al.).

The epoxy material may be described, in part by its epoxide equivalent weight (EEW). Knowing the EEW of a particular epoxy material is often helpful when determining the amount of other ingredients to be added to the composition to prepare a coating composition of the present invention. For instance, commercially available epoxy materials available under trade designations such as EPON 828, 1001, 1007, 1009 from Resolution Performance Products, Houston, Tex. These epoxy materials may have varying EEWs that need to be adjusted prior to use. The adjustment of the epoxy material to obtain the desired EEW may be accomplished by the addition of a dihydroxy compound, e.g., Bisphenol A. The amount of Bisphenol A useful to adjust the EEW in the present invention depends on the desired EEW. Preferred EEWs are at least 1,600, and more preferably at least 2,500. Preferred EEWs are at most 3,800, and more preferably at most 3,200. A presently preferable epoxy material is a diglycidyl ether of Bisphenol A, e.g., Epon 1009F.

Commercially available epoxy materials may contain a mixture of diepoxides, monoepoxides and aromatic polyethers which are free of epoxy groups. Preferred epoxy materials are aromatic polyethers having a number average molecular weight ($M_n$) of at least 350, more preferably at least 1,000, and most preferably at least 1,500. Preferred epoxy materials are aromatic polyethers having a number average molecular weight ($M_n$) of at most 6,000, more preferably at most 4,500, and most preferably at most 4,000.

The adjustment of the epoxy material may suitably include the advancement of the molecular weight. Typically the advancement of the molecular weight may be enhanced by the use of a catalyst. Typical catalysts usable in the advancement of the molecular weight of the epoxy material of the present invention include amines, hydroxides (e.g., potassium hydroxide), phosphonium salts, and the like. A presently preferred catalyst is an amine catalyst. The amine catalyst useful in the present invention is preferably present in an amount sufficient to facilitate the desired condensation reaction, e.g., the condensation reaction between Bisphenol A and low epoxide equivalent weight epoxies, e.g., EPON 828.

For the present invention, tertiary amines are preferred. Typically, the tertiary amine suitable for use to enhance the reaction include, for example, dimethylethanolamine, dimethylbenzylamine, trimethylamine, tributylamine, and the like. The amount of tertiary amine used in the present invention is preferably at least 0.05 weight percent and more preferably at least 0.1 weight percent, based on the weight of the epoxy composition. Tertiary amine used in the present invention is preferably at most 0.3 weight percent, more preferably at most 0.25 weight percent, and most preferably at most 0.2 weight percent, based on the weight of the epoxy composition. A presently preferable tertiary amine is tributylamine.

A reactive diluent is preferably blended with the epoxy material. As used in the present invention, "reactive diluent" relates to monomers and oligomers that are essentially non-reactive with the epoxy resin or any carboxylic acid moiety that might be present, e.g., on the acrylic resin, under contemplated blending conditions. The reactive diluents useful in the present invention are also capable of undergoing a reaction to form a polymer, described as an interpenetrating network with the epoxy acrylate, or with unsaturated moieties that may optionally be present, e.g., on the acrylic resin. Reactive diluents suitable for use in the present invention preferably include free-radical reactive monomers and oligomers. A small amount of reactive diluent that can undergo reaction with the epoxy resin may be used (e.g., hydroxy monomers such as 2-hydroxy ethylmethacrylate, amide monomers such as acrylamide, and N-methylol monomers such as N-methylol acrylamide). Reactive diluents useful in the present invention include, for example, vinyl compounds, acrylate compounds, methacrylate compounds, acrylamides, acrylonitriles, and the like.

Suitable vinyl compounds useful in the preparation of the reactive diluent, include, for example, vinyl toluene, vinyl acetate, vinyl chloride, vinylidene chloride, styrene, substituted styrenes, and the like.

Suitable acrylate compounds include butyl acrylate, ethyl acrylate, 2-ethylhexyl acrylate, isobutyl acrylate, tert-butyl acrylate, methyl acrylate, 2-hydroxyethyl acrylate, poly(ethylene glycol)acrylate, isobornyl acrylate, and combinations thereof.

Suitable methacrylate compounds include, for example, butyl methacrylate, methyl methacrylate, ethyl methacrylate, isobutyl methacrylate, 2-hydroxyethyl methacrylate, poly(ethylene glycol)methacrylate, poly(propylene glycol) methacrylate, and combinations thereof.

The reactive diluent preferably functions as a solvent or otherwise lowers the viscosity of the blend of reactants. Presently preferred reactive diluents include styrene and butyl acrylate. The use of one or more reactive diluents as a "solvent" eliminates or reduces the need to incorporate a substantial amount of other cosolvents (such as butanol) during processing.

A wide variety of cosolvents are suitable for use in the present invention. As previously mentioned, the use of cosolvents, however, may contribute to an undesirable high level of volatile organic compounds that would have to be removed or recovered. A careful selection of cosolvents useable in the present invention is preferable to provide a coating composition having a low volatile organic compound content. Typical cosolvents useful in the present invention include organic materials, such as xylene, toluene, butanol, 2-butoxyethanol, amyl alcohol, and 2-hexyloxyethanol. Presently preferred cosolvents include 2-hexyloxyethanol (hexyl cellosolve), amyl alcohol, etc. Cosolvents may be usable in the present invention, for example, to enhance the dissolution of the reactive diluent and/or improve the performance of the reactive diluent as solvent for the other ingredients.

Preferred acrylic resins suitable for use in the present invention comprise polymers and copolymers having a polymeric backbone having at least one pendant or terminal carboxylic acid moiety.

Suitable carboxylic acid containing monomers for use in forming acrylic resins include, for example, acrylic acid, methacrylic acid, fumaric acid, crotonic acid, maleic acid, itaconic acid, and the like.

Suitable optional co-monomers for use in forming acrylic resins include, for example, ethyl acrylate, methyl acrylate, butyl acrylate, ethyl methacrylate, methyl methacrylate, butyl methacrylate, styrene, substituted styrene, vinyl toluene, vinyl acetate, vinyl chloride, vinylidene chloride, acrylamide, acrylonitrile, 2-ethylhexyl acrylate, isobutyl acrylate, tert-butyl acrylate, 2-hydroxyethyl acrylate, poly (ethylene glycol)acrylate, isobornyl acrylate, and the like.

In certain applications, it may be advantageous to include self-crosslinking monomers in forming acrylic resins. Such self-crosslinking monomers include, for example, N-methylol acrylamide, N-isobutoxy acrylamide, and combinations thereof. A presently preferred acrylic resin comprises the reaction product of acrylic acid, ethyl acrylate, and styrene monomers.

The acrylic resin suitable for use in the present invention preferably has number average molecular weight of at least 2,000 and more preferably at least 3,000. The acrylic resin suitable for use in the present invention preferably has number average molecular weight of at most 10,000, more preferably at most 7,000, and most preferably at most 5,000. The acid number of the acrylic resin is preferably at least 250, more preferably at least 300, and most preferably at least 350. The acid number of the acrylic resin is preferably at most 420.

Preferably, the acrylic resin is preformed and then blended with the epoxy material and reactive diluent.

The epoxy acrylate resin of the present invention is preferably prepared by the reaction of the epoxy material and the acrylic resin. The reaction may be facilitated through the presence of an amine. A tertiary amine is presently preferred. The amount of amine used may vary widely. Preferably at least 0.1 percent by weight, and more preferably at least 0.3 percent by weight of the amine, based on the total weight of epoxy material and acrylic resin, is used. Preferably, no greater than 10 percent by weight of the amine, based on the total weight of epoxy material and acrylic resin, is used. Suitable tertiary amines for use in facilitating the reaction include, for example, dimethylethanolamine, dimethylbenzylamine, trimethylamine, tributylamine, and the like. A presently preferred tertiary amine is dimethylethanolamine.

The epoxy acrylate and the reactive diluent of the present invention are preferably dispersed in water. Without willing to be bound by theory, the dispersion is believed to be aided by the ionic component resulting from the reaction above to produce the epoxy acrylate. The maximum amount of epoxy acrylate and reactive diluent dispersible in the water is believed to be limited by the selection and concentration of the ionic component.

The reactive diluent of the present invention is then polymerized in the presence of the epoxy acrylate to form the coating composition of the present invention. Preferably, the polymerization may be accomplished with the use of a suitable initiator. The initiator (e.g., a free radical initiator) useful for the polymerization may be inorganic or organic. Suitable initiators include, for example, peroxides, persulfates, sulfites, bisulfites, azoalkanes, and UV or visible light initiators. Other initiators may additionally or alternatively be used. Typical peroxides include, for example, benzoyl peroxide, and t-butyl hydroperoxide. Typical persulfates include, for example, ammonium persulfate and other alkali metal persulfates. Alkali metal persulfates may be combined with a suitable reducing agent such as hydrazine, ammonium or alkali metal sulfites, bisulfites, metabisulfites or hydrosulfites. In a preferred embodiment, a combination of benzoin and hydrogen peroxide is suitable for use as the initiator and may be incorporated for the polymerization of the reactive diluent. Suitably, the initiator useful in the present invention is present in an amount sufficient to effectively polymerize the reactive diluent. The amount of initiator used is preferably at least 0.5 weight percent and more preferably at least 1 weight percent, based on the weight of the reactive diluent. The amount of initiator used is preferably at most 3 weight percent, more preferably at most 2.5 weight percent, and most preferably at most 2 weight percent, based on the weight of the reactive diluent.

Optionally, a further addition of reactive diluent and/or initiator may be charged to the dispersion, e.g., to further facilitate the polymerizion of the reactive diluent.

Additionally, water, amines, and/or cosolvents may be added as required to produce the final coating composition.

The volatile organic compound content of the coating composition of the present invention is surprisingly low. Preferably, the volatile organic compound content is no greater than 0.4 kilogram per liter of the solids. It is believed that the low VOC content is attributable to the use of the reactive diluent as solvent, the use of significantly lower amounts of other VOC contributing cosolvents, and the novel process and combination of the materials used in the preparation of the coating composition.

In certain embodiments, the coating composition of the present invention is substantially free of formaldehyde. In preferred embodiments the coating composition of the present invention is essentially free of formaldehyde, more preferably essentially completely free of formaldehyde, and most preferably completely free of formaldehyde. The coating composition of the present invention preferably does not include phenolic resin and/or melamine. Typically, phenolic resins and/or melamines are used as crosslinkers in coating compositions. The absence of phenolic resin and/or melamine is believed to contribute to a coating composition that is substantially free of formaldehyde.

The term "substantially free of formaldehyde" means that the compositions of the present invention are contaminated with, or liberate as a result of curing, no greater than 1 percent by weight formaldehyde. The term "essentially free of formaldehyde" means that the compositions of the present invention are contaminated with, or liberate as a result of curing, no greater than 0.5 percent by weight formaldehyde. The term "essentially completely free of formaldehyde" means that the compositions of the present invention are contaminated with, or liberate as a result of curing, no greater than 0.25 percent by weight formaldehyde. The term "completely free of formaldehyde" means that the compositions of the present invention are contaminated with, or liberate as a result of curing, no greater than 5 parts per million (ppm) formaldehyde.

The coating composition of the present invention are preferably useful to coat the inside of a packaging substrate. The coating may be applied by a variety of processes. Typical application processes include sheet coating, coil coating, roll coating, spray coating, and the like. In a typical roll coating process, the packaging substrate is preferably a flat metal substrate prior to coating. The flat metal (e.g., aluminum) may then be fed through an oven to volatize or remove the solvents and harden the coating.

A method of sheet coating may be by direct roll coating of flat sheets of metal, typically 1 $m^2$ in size. The coated sheets of metal may then be fed through a forced draft, gas-fired, or any suitable oven to remove the solvents. Alternatively (or in addition), the sheets may be fed through a vacuum chamber to remove the solvents. Other sheet coating processes are also usable and may depend on the equipment and processing capabilities.

A suitable coil coating process preferably includes application of the coating composition by reverse roll-coating on a continuous metal coil. The continuous metal coil may then be fed through a high velocity, gas-fired oven as may be required to remove the solvents and harden the coating. The temperatures of the oven may depend on the speed of the coating process, heat transfer conditions and/or other factors in order to obtain the desired cure of the coating.

Spray coating includes the introduction of the coated composition into the inside of a preformed packaging container. Typical preformed packaging containers suitable for spray coating include food cans, beer and beverage containers, drug bottles, and the like. The spray preferably utilizes a spray nozzle capable of uniformly coating the inside of the preformed packaging container. The sprayed preformed container is then subjected to heat to remove the residual solvents and harden the coating.

For flat panels, the coated packaging substrate may then be formed into a package (or portions of a package), e.g., by stamping, drawing, machining, or by any other process as is known in the art. Welding of the edges may also be incorporated if so required. Typical forming process includes draw-redraw (DRD), draw and iron (D&I), and the like.

The coated and formed substrates are preferably then useful to package food, beer or beverage, drugs, or other ingredients as desired.

EXAMPLES

The following examples are offered to aid in understanding of the present invention and are not to be construed as limiting the scope thereof. Unless otherwise indicated, all parts and percentages are by weight.

Test Methods

Adhesion

Adhesion testing was performed to assess whether the coating adheres to the metal substrate. The adhesion test was performed according to ASTM D 3359—Test Method B, using an adhesive tape available under the trade designation SCOTCH 610 from Minnesota Mining and Manufacturing (3M) of Saint Paul, Minn. A rating scale was used to indicate the level of failure, where applicable as discussed below.

Blush Resistance

Blush resistance measures the ability of a coating to resist attack by various solutions. Typically, it is measured by the amount of water absorbed into a coating. When the coated substrate absorbs water, it is generally cloudy or looks white. Blush is measured visually on a graduated scale as discussed below Rating Scale Rating scale used: 0 to 10, where "0" is a complete failure and "10" is no failure. For the Blush test, a rating of "10" would indicate no whitening of the coated film, a "0" would indicate a complete whitening of the coated film, etc. For the Adhesion test, a rating of "10" indicates no failure due to adhesion, a rating of "9" would indicate that 90% of the can remained adhered, and a rating of "8" would indicate that 80% of the can remained adhered, etc.

Damage Resistance

Damage resistance measures the ability of the coated container to resist cracks after being exposed to the various solutions and conditions. The presence of cracks is measured by passing electrical current via an electrolyte solution. A coated container is filled with an electrolyte solution and the amount of electrical current that can pass through the container is recorded. After the initial measurement is made, the cans are dropped from a specified height onto an inclined plane to simulate a fall. The electrical current that can pass through the container is again measured. If there is no damage, no current will pass through the container. An average of 5 containers is evaluated. It is calculated as the ratio of the initial condition of the container (before exposure), and final condition (after exposure). A container with an average rating of 0 has no damage, while a container with an average rating of 2 has damage allowing an average of 2 millivolts to pass.

Example 1

Preparation of Acrylic Resin

TABLE 1

| Material | Parts by Weight. |
|---|---|
| Water | 2.3 |
| Amyl Alcohol | 23.8 |
| Hexyl Cellosolve | 1.6 |
| Glacial Acrylic Acid | 19.1 |
| Ethyl Acrylate | 9.1 |
| Styrene Monomer | 17.2 |
| Benzoyl peroxide | 3.8 |
| Butyl Acrylate | 23.1 |

Deionized water, primary amyl alcohol (obtainable from Dow Chemical), and ethylene glycol hexyl ether (Hexyl Cellosolve, obtainable from Dow Chemical) were charged to a two-liter glass reactor equipped with a stirrer, reflux condenser, thermometer, addition funnel, and nitrogen inlet. Nitrogen flow was started and the reactor was heated to 100° C. A premix of acrylic acid (obtainable from Celanese Chemicals), ethyl acrylate (obtainable from Celanese Chemicals), styrene (obtainable from Dow Chemical), and benzoyl peroxide (obtainable from Laporte Companies) was added over a two-hour period, the temperature of the reactor held constant for 2 hours. The heat source and the nitrogen blanket were then removed, and the batch cooled. Butyl acrylate (obtainable from Dow Chemical) was added.

The resulting acrylic resin had solids content of 48%, an acid number of 300, and a viscosity of 3.5 Pascal seconds.

Example 2

Preparation of Epoxy Acrylate Dispersion

TABLE 2

| Material | Parts by Weight |
|---|---|
| DGEBA | 16.9 |
| Hexyl Cellosolve | 1.9 |
| Butyl Acrylate | 0.6 |
| Styrene Monomer | 6.3 |
| Acrylic Resin (Ex. 1) | 15.7 |
| Dimethanolamine | 1.8 |
| Deionized Water | 56.6 |
| Benzoin (Practical) | 0.1 |
| Hydrogen Peroxide | 0.1 |

Diglycidyl ether of bisphenol A (Epon 1009F[DGEBPA], obtainable from Resolution Performance Products, Houston, Tex.) and ethylene glycol hexyl ether were charged to a suitable two-liter reactor equipped with a stirrer, reflux condenser, thermometer, addition funnel, and nitrogen inlet. Nitrogen flow was started, heat applied to 150° C., and the temperature was held constant with agitation until all the charge melted. Butyl acrylate and styrene were added under constant temperature. The acrylic resin of Example 1 was then added while maintaining a minimum temperature of 115° C. Dimethyl ethanol amine (Dimethylaminoethanol obtainable from Dow Chemical) was added over 10 minutes, and the reaction held at 110° C. for 60 minutes. Deionized water was added under strong agitation over a 90-minute period.

The temperature of the reaction was adjusted to 75° C. Benzoin (obtainable from Eastman Chemical), and 35% hydrogen peroxide obtainable from FMC were added with a deionized water flush. After a peak exotherm, the dispersion was held at 85° C. for 2 hours, and then filtered into a suitable container. The dispersion had a solids content of 35.7%, viscosity of 0.5 Pascal seconds at a pH of 6.5.

Example 3

Preparation of the Coating Composition

TABLE 3

| Material | Parts by Weight |
|---|---|
| Epoxy Acrylate Dispersion (Ex. 2) | 54.3 |
| Deionized Water | 41.9 |
| Dimethylaminoethanol | 0.1 |
| Butyl Cellosolve | 2.5 |
| Primary Amyl Alcohol | 1.2 |

The coating dispersion of Example 2 was charged into a stainless steel container. Deionized water, dimethyl ethanol amine, ethylene glycol monobutyl ether (Eastman EB, obtainable from Eastman Chemical), and primary amyl alcohol were sequentially added slowly under agitation. The batch was continuously stirred for 60 minutes. The coating composition had a viscosity of 16 seconds using a #4 Ford Cup, and solids content of 19%.

Example 4

Comparative Coating Composition

An aqueous coating composition was prepared according to the Example disclosed in U.S. Pat. No. 4,476,262 (Chu et al.). The coating composition was sampled and tested for volatile organic compound content as described in ASTM 2369-86.

The coating composition of Example 3 was similarly sampled and tested for VOC content.

Table 4 illustrates the VOC content obtained in Examples 3 and 4.

TABLE 4

VOC Content Evaluation

| Example # | Material (kg) | Solvent (kg) | VOC Content (kg/l of solids) |
|---|---|---|---|
| 3 | 71.98 | 25.83 | 0.29 |
| 4 | 68.83 | 47.41 | 0.62 |

Example 5

Testing Protocols for Performance Evaluation of Coating Formulations

A (time based) protocol was used to evaluate the coatings. In this protocol, fabricated cans are coated, cured at various peak metal temperatures (PMTs) such as: 190° C. for 60 seconds and 205° C. for 75 seconds. The fabricated cans are then exposed to varying conditions as indicated in the table below. Deionized water, and other inputs were introduced into the fabricated cans up to half-fill level. The coated cans (media) were evaluated for Blush and Adhesion. After test conditions, different fill levels of the cans were evaluated as follows: Portions covered by liquid fill (Upper Side Wall, Lower Side Wall, Dome); and portion exposed to vapor (Upper Side Wall, Lower Side Wall). In a typical 11 cm tall fabricated can, the "Upper Side Wall" relates to the height of 7 to 10 cm from the bottom of the can; the "Lower Side Wall" indicates the height of 2 to 5 cm from the bottom of the can. The "Dome" is the center of the bottom of the can. The conditions included the following:

TABLE 5

Description of Liquid Fill Conditions

| Test Number | Name | Liquid Fill | Temperature (° C.) | Time (min) |
|---|---|---|---|---|
| 1 | Pasteurization | Water | 80 | 45 |
| 2 | Boiling Water | Water | 100 | 15 |
| 3 | Hot Fill Test | Water | 90 | 30 |
| 4 | TR-1 | Trisodium Phosphate | 100 | 15 |
| 5 | Joy | Dishwashing | 85 | 10 |
| 6 | Gatorade Hot Fill | Gatorade | 90 | 30 |

The tables below include the results obtained from the evaluation of the coated cans. The coated cans were evaluated for Blush Resistance and Adhesion.

TABLE 6A

Evaluation of Coated Cans for Blush/Adhesion

| Ex. # | Coating wt. | Water Up-SW | Water Lo-SW | Water Dome | Vapor Up-SW | Vapor Lo-SW |
|---|---|---|---|---|---|---|
| Pasteurization | | | | | | |
| 3 | Beer | 10/10 | 10/10 | 10/10 | 10/10 | 10/10 |
|  | Soft Drink | 10/10 | 10/10 | 10/10 | 10/10 | 10/10 |
|  | Hard-to-hold | 10/10 | 10/10 | 10/10 | 10/10 | 10/10 |
| Control | Beer | 10/10 | 10/10 | 10/10 | 10/10 | 10/10 |
|  | Soft Drink | 10/10 | 10/10 | 10/10 | 10/10 | 10/10 |
|  | Hard-to-hold | 10/10 | 10/10 | 10/10 | 10/10 | 10/10 |
| Boiling Water | | | | | | |
| 3 | Beer | 10/10 | 10/10 | 10/10 | 10/10 | 10/10 |
|  | Soft Drink | 10/10 | 10/10 | 10/10 | 10/10 | 10/10 |
|  | Hard-to-hold | 10/10 | 10/10 | 10/10 | 10/10 | 10/10 |
| Control | Beer | 10/10 | 10/10 | 10/10 | 10/10 | 10/10 |
|  | Soft Drink | 10/10 | 10/10 | 10/10 | 10/10 | 10/10 |
|  | Hard-to-hold | 10/10 | 10/10 | 10/10 | 10/10 | 10/10 |
| Hot Fill Test | | | | | | |
| 3 | Beer | 10/10 | 10/10 | 10/10 | 10/10 | 10/10 |
|  | Soft Drink | 10/10 | 10/10 | 10/10 | 10/10 | 10/10 |
|  | Hard-to-hold | 10/10 | 10/10 | 10/10 | 10/10 | 10/10 |
| Control | Beer | 10/10 | 10/10 | 10/10 | 10/10 | 10/10 |
|  | Soft Drink | 10/10 | 10/10 | 10/10 | 10/10 | 10/10 |
|  | Hard-to-hold | 10/10 | 10/10 | 10/10 | 10/10 | 10/10 |
| TR-1 | | | | | | |
| 3 | Beer | 10/10 | 10/10 | 10/10* | 10/10 | 10/10 |
|  | Soft Drink | 10/10 | 10/10 | 10/10* | 10/10 | 10/10 |
|  | Hard-to-hold | 10/10 | 10/10 | 10/10* | 10/10 | 10/10 |
| Control | Beer | 10/10 | 10/10 | 9–10/10 | 10/10 | 10/10 |
|  | Soft Drink | 10/10 | 10/10 | 9–10/10 | 10/10 | 10/10 |
|  | Hard-to-hold | 10/10 | 10/10 | 9–10/10 | 10/10 | 10/10 |
| Joy Test | | | | | | |
| 3 | Beer | 10/10 | 10/10 | 10/10* | 10/10 | 10/10 |
|  | Soft Drink | 10/10 | 10/10 | 10/10* | 10/10 | 10/10 |
|  | Hard-to-hold | 10/10 | 10/10 | 10/10* | 10/10 | 10/10 |
| Control | Beer | 10/10 | 10/10 | 10/10 | 10/10 | 10/10 |
|  | Soft Drink | 10/10 | 10/10 | 10/10 | 10/10 | 10/10 |
|  | Hard-to-hold | 10/10 | 10/10 | 10/10 | 10/10 | 10/10 |

*Treatment Spots on Dome
Up-SW: Upper Side Wall of Can;
Lo-SW: Lower Side Wall of Can.
10/10: 10 Blush/10 Adhesion.

The coating film weights were evaluated for various intended input such as Beer, Soft Drink, and Hard-to-Hold. Coating film weights for Beer are 90 to 115 mg/can; coating film weights for Soft Drink are 115 to 145 mg/can; and coating film weights for Hard-to-hold are 145 to 185 mg/can. "Hard-to-hold" is used to represent fills that require thicker coating weights to maintain in a can, such as Gatorade, Milk chocolate, fruit juices, isotonic drinks, etc.

The table below illustrates the results of the coated cans evaluated for Adhesion and Damage Resistance.

TABLE 6B

Evaluation of Coated Cans for Damage and Adhesion

| Sample | Coating wt. | Adhesion Up-SW | Adhesion Lo-SW | Adhesion Dome | Damage A/B |
|---|---|---|---|---|---|
| Gatorade Hot Fill Test | | | | | |
| 3 | HTH | 10 | 10 | 10 | 1.6 |
|  | Soft Drink | 10 | 10 | 10 | 2.8 |
| Control | HTH | 10 | 10 | 10 | 1.8 |

TABLE 6B-continued

Evaluation of Coated Cans for Damage and Adhesion

| Sample | Coating wt. | Adhesion | | | Damage A/B |
| --- | --- | --- | --- | --- | --- |
| | | Up-SW | Lo-SW | Dome | |
| Soft Drink | | 10 | 10 | 10 | 4.2 |

HTH(2)—Hard to hold dried at 205° C. for 75 seconds.
Damage Evaluated A/B - Initial metal exposure/Metal exposure after test The above data illustrate that the coatings of the present invention are able to achieve the standard of performance expected of current commercial coatings, but with reduced VOC content and being free of formaldehyde.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A method of making a coating composition, comprising the steps of:
   blending an epoxy material, a reactive diluent, and an acrylic resin;
   reacting the epoxy material and the acrylic resin to form an epoxy acrylate resin;
   dispersing the reactive diluent and the epoxy acrylate resin into water; and
   polymerizing the reactive diluent, wherein the aqueous coating composition formed has a volatile organic compound content of no greater than 0.4 kilogram per liter of solids.

2. The method of claim 1, wherein the epoxy material comprises diglycidyl ether of bisphenol-A.

3. The method of claim 1, wherein the molecular weight of the epoxy material is 350 to 6,000.

4. The method of claim 1, wherein the molecular weight of the epoxy material is 1,500 to 4,000.

5. The method of claim 1, wherein the acrylic resin comprises a polymeric backbone having at least one pendant or terminal carboxylic acid moiety.

6. The method of claim 5, wherein the acrylic resin is formed using a monomer selected from the group consisting of acrylic acid, methacrylic acid, fumaric acid, crotonic acid, maleic acid, and itaconic acid.

7. The method of claim 5, wherein the acrylic resin is formed using a monomer selected from the group consisting of ethyl acrylate, methyl acrylate, butyl acrylate, ethyl methacrylate, methyl methacrylate, butyl methacrylate, styrene, substituted styrene, vinyl acetate, vinyl chloride, vinylidene chloride, 2-ethylbexyl acrylate, isobutyl acrylate, tert-butyl acrylate, 2-hydroxyethyl acrylate, poly(ethylene glycol) acrylate, isobornyl acrylate, acrylamide, and acrylonitrile.

8. The method of claim 5, wherein the acrylic resin is formed using acrylic acid, styrene, and ethyl acrylate.

9. The method of claim 1, wherein the composition further comprises an initiator.

10. The method of claim 1, wherein the volatile organic compound content of the coating composition is no greater than 0.3 kilogram per liter of solids.

11. The method of claim 1, wherein the volatile organic compound content of the coating composition is no greater than 0.2 kilogram per liter of solids.

12. The method of claim 1, wherein the volatile organic compound content of the coating composition is no greater than 0.1 kilogram per liter of solids.

13. The method of claim 1, wherein the coating composition is substantially free of formaldehyde.

14. A method of coating a substrate comprising the steps of:
   applying a coating prepared according to the method of claim 1 on a substrate; and
   hardening the coating.

15. The method of claim 14, wherein the substrate is metal.

16. The method of claim 14, wherein the substrate is a portion of a container.

17. A coating composition prepared by the method of claim 1.

18. A substrate coated with a coating composition prepared according to the method of claim 1.

19. A method of making a coating composition, comprising the steps of:
   blending an epoxy material, a reactive diluent, and an acrylic resin;
   reacting the epoxy material and the acrylic resin to form an epoxy acrylate resin;
   dispersing the reactive diluent and the epoxy acrylate resin into water; and
   polymerizing the reactive diluent, wherein the aqueous coating composition formed has a volatile organic compound content of no greater than 0.4 kilogram per liter of solids, and
   wherein the reactive diluent is selected from the group consisting of ethyl acrylate, 2-ethylhexyl acrylate, methyl acrylate, butyl acrylate, isobutyl acrylate, tert-butyl acrylate, 2-hydroxyethyl acrylate, poly(ethylene glycol) acrylate, isobornyl acrylate, butyl methacrylate, methyl methacrylate, ethyl methacrylate, isobutyl methacrylate, 2-hydroxyethyl methacrylate, poly(ethylene glycol) methacrylate, poly(propylene glycol) methacrylate, styrene, substituted styrene, vinyl acetate, vinyl chloride, vinylidene chloride, acrylamide, and acrylonitrile.

20. The method of claim 19, wherein the reactive diluent comprises butyl acrylate and styrene.

21. The method of claim 19, wherein the reactive diluent comprises butyl acrylate.

22. A method of making a coating composition, comprising the steps of:
   blending an epoxy material, a reactive diluent, and an acrylic resin;
   reacting the epoxy material and the acrylic resin to form an epoxy acrylate resin;
   dispersing the reactive diluent and the epoxy acrylate resin into water; and
   polymerizing the reactive diluent, wherein the aqueous coating composition formed has a volatile organic compound content of no greater than 0.4 kilogram per liter of solids, and
   wherein the composition further comprises an initiator selected from the group consisting of peroxides, persulfates, sulfites, bisulfites, azoalkanes, UV light initiators, and visible light initiators.

23. A method of making a coating composition, comprising the steps of:

blending an epoxy material, a reactive diluent, and an acrylic resin;

reacting the epoxy material and the acrylic resin to form an epoxy acrylate resin;

dispersing the reactive diluent and the epoxy acrylate resin into water; and polymerizing the reactive diluent, wherein the aqueous coating composition formed has a volatile organic compound content of no greater than 0.4 kilogram per liter of solids, and wherein the composition further comprises an initiator selected from the group consisting of benzoyl peroxide, t-butyl hydroperoxide, ammonium persulfate, hydrazine, ammonium sulfites, alkali metal sulfites, bisulfites, metabisulfites, hydrosulfites, and combinations thereof.

24. A method of making a coating composition, comprising the steps of:

blending an epoxy material, a reactive diluent, and an acrylic resin;

reacting the epoxy material and the acrylic resin to form an epoxy acrylate resin;

dispersing the reactive diluent and the epoxy acrylate resin into water; and polymerizing the reactive diluent, wherein the aqueous coating composition formed has a volatile organic compound content of no greater than 0.4 kilogram per liter of solids, and wherein the composition further comprises an initiator comprising benzoin and hydrogen peroxide.

* * * * *